Patented Oct. 15, 1935

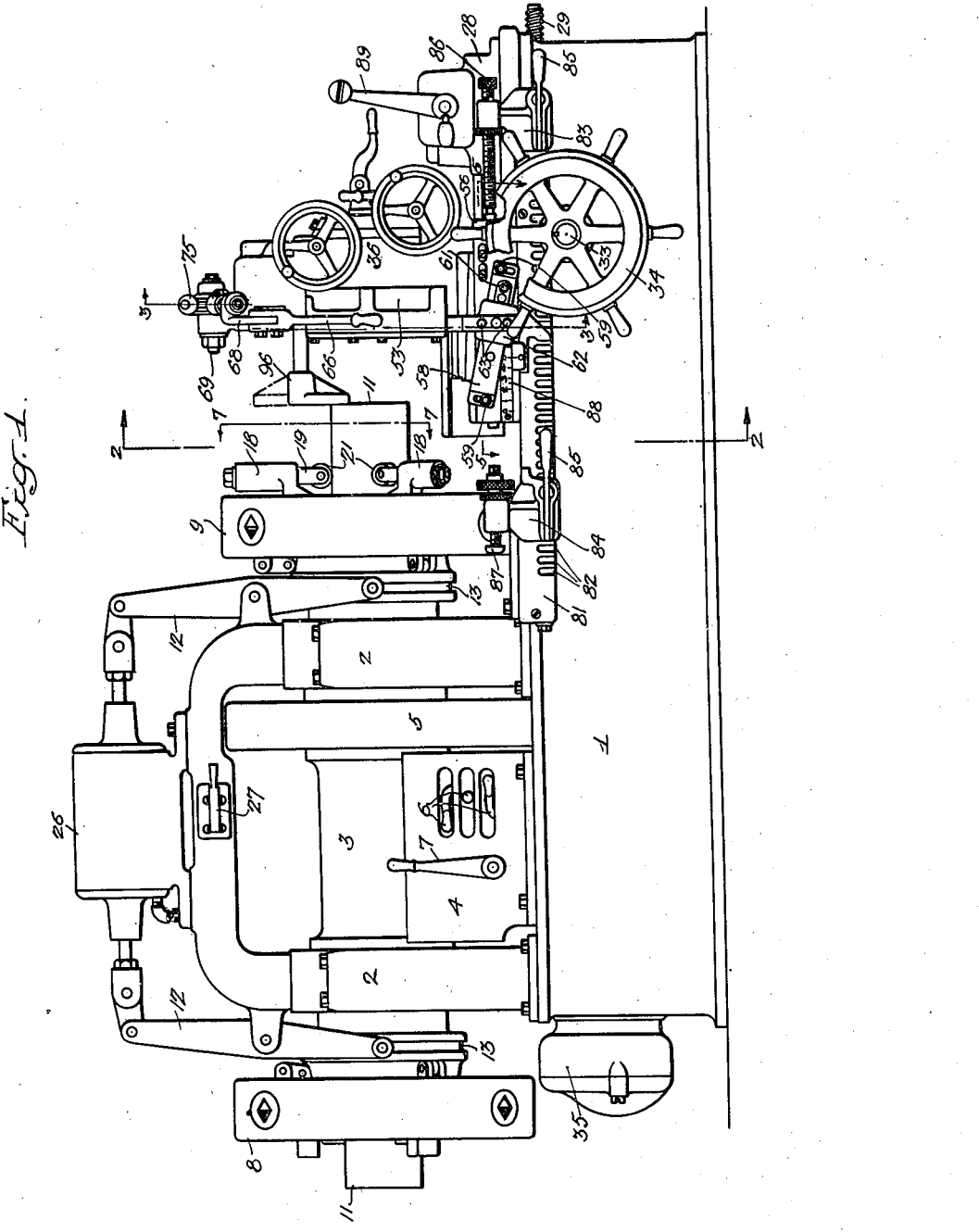

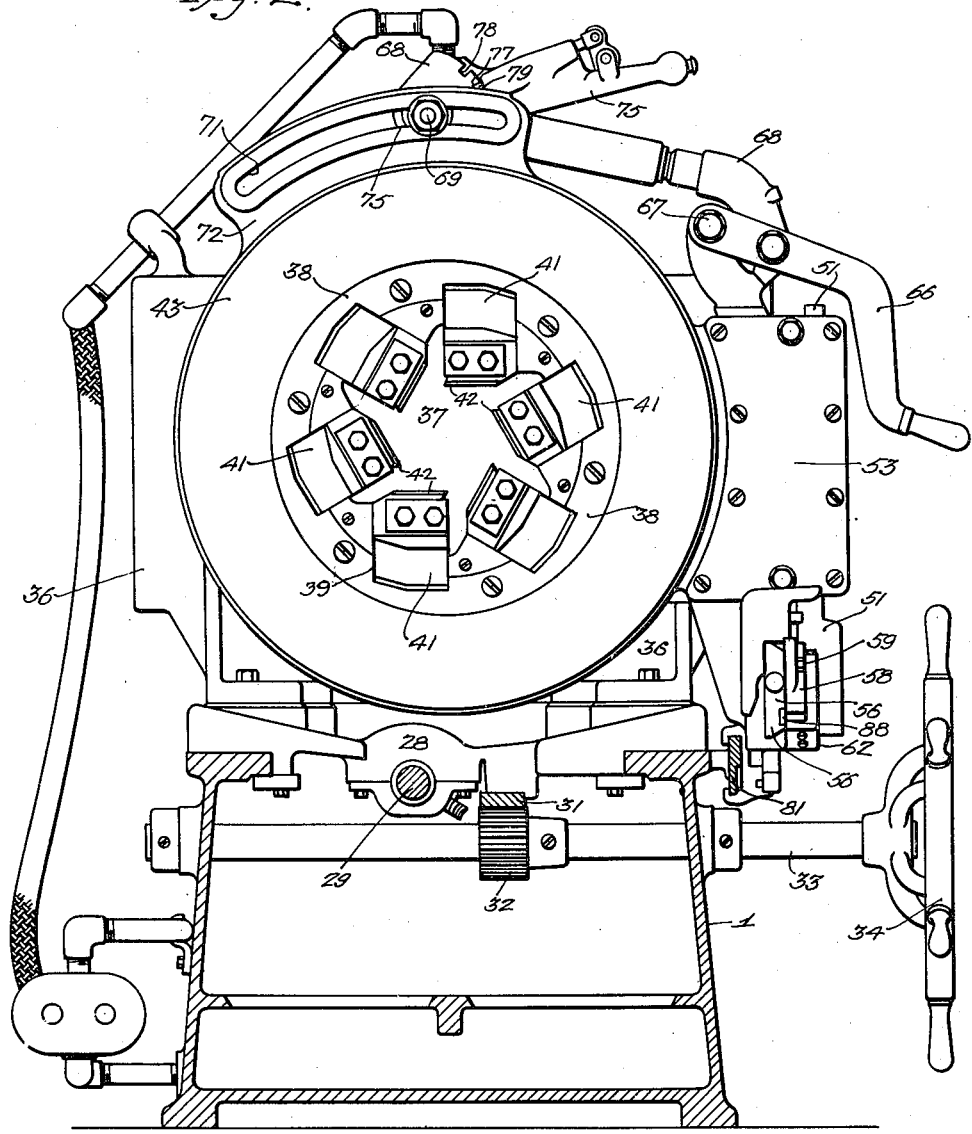

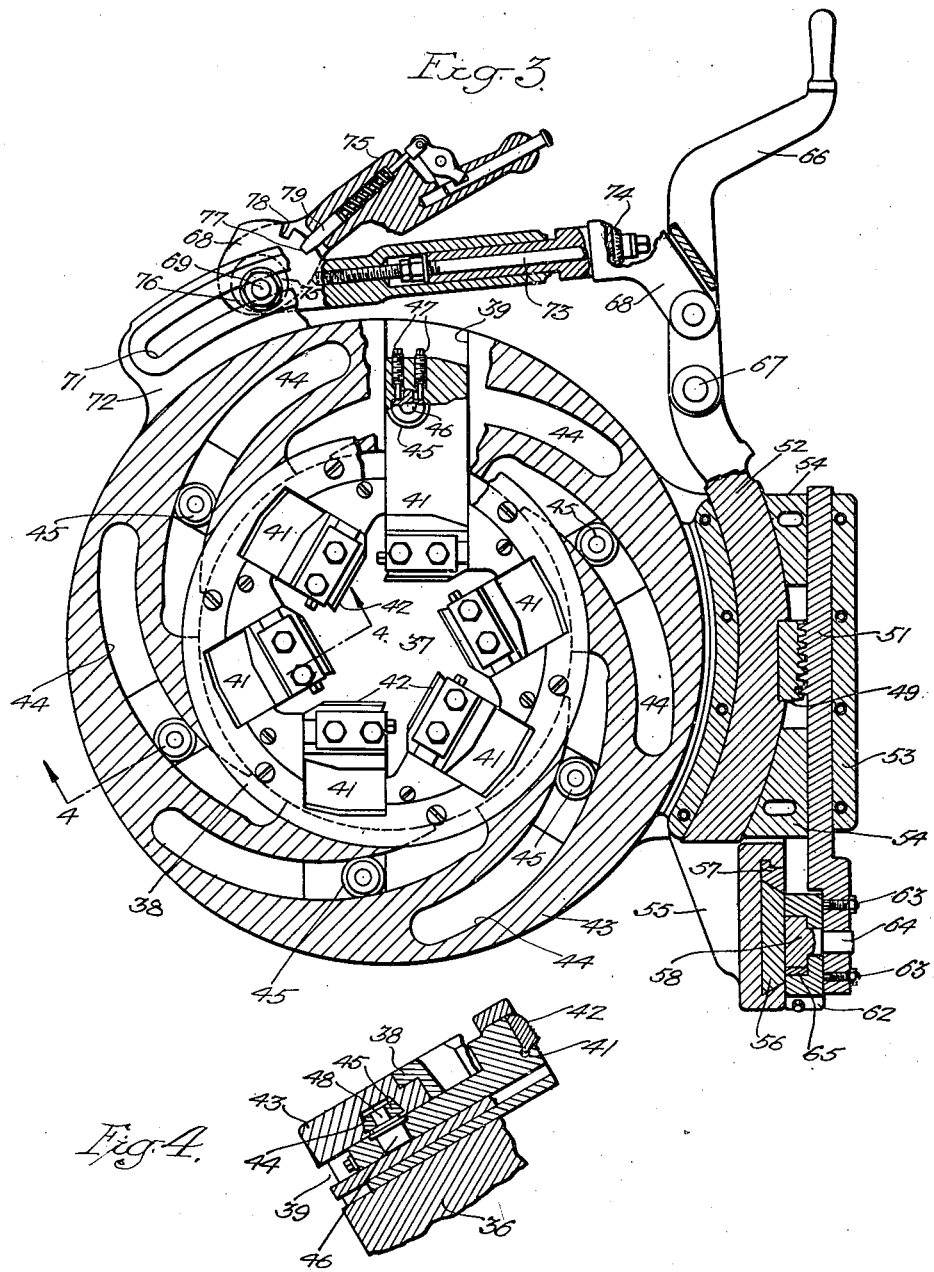

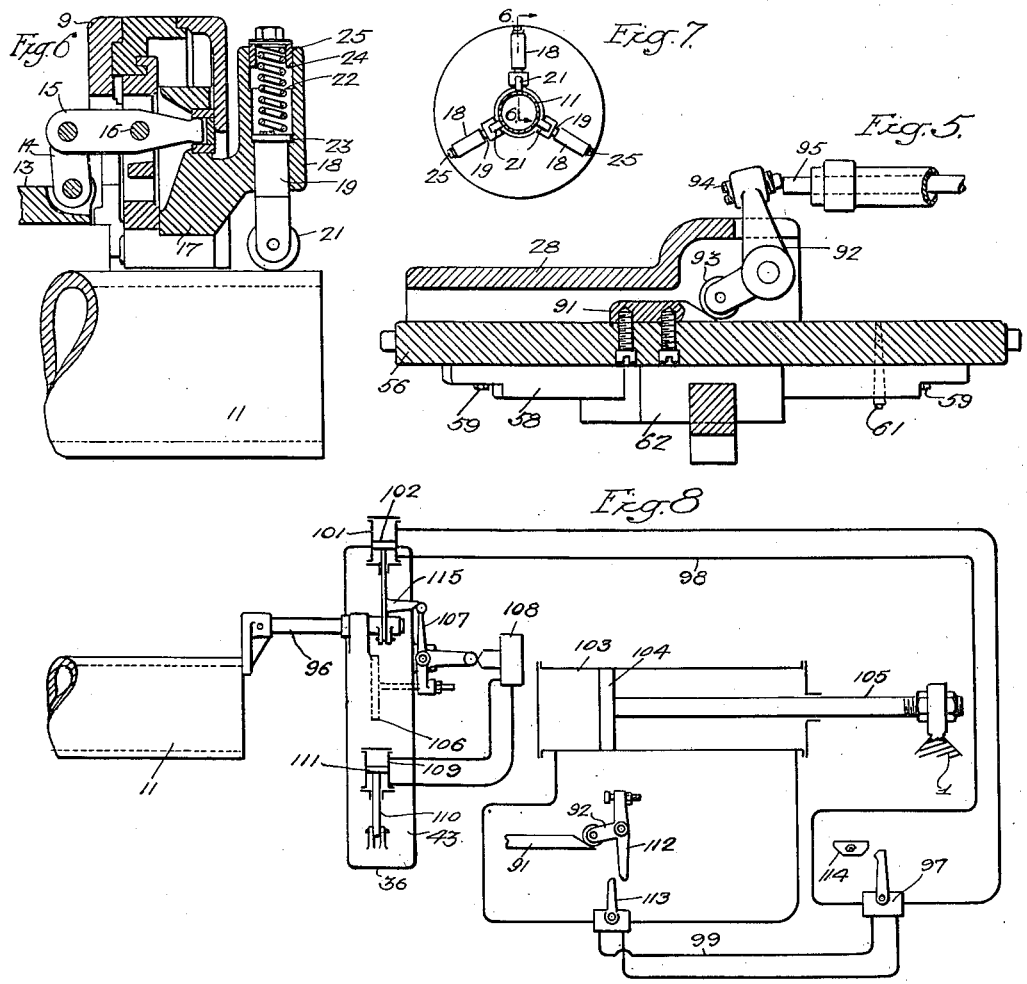

2,017,764

UNITED STATES PATENT OFFICE 2,017,764

THREADING MACHINE

Samuel W. Mathias, Waynesboro, Pa., assignor to Landis Machine Company, Waynesboro, Pa., a corporation of Pennsylvania Application September 29, 1932, Serial No. 635,447

15 Claims. (Cl. 10—96)

This invention relates to machines for cutting threads on pipes, tubes and other cylindrical stock, and the object of the invention is to provide a generally improved machine of this character adapted for cutting threads of various tapers and lengths on stock of various diameters.

A machine made in accordance with my invention is illustrated in the attached drawings, in which:

Figure 1 is a view in side elevation of a machine made in accordance with my invention;

Fig. 2 is a section on the line 2—2, Fig. 1;

Fig. 3 is a section on the line 3—3, Fig. 1;

Fig. 4 is a fragmentary section on the line 4—4, Fig. 3;

Fig. 5 is a fragmentary section on the line 5—5, Fig. 1;

Fig. 6 is a partial sectional view on the line 6—6, Fig. 7, showing the details of the work-centering device;

Fig. 7 is a section on the line 7—7, Fig. 1, and

Fig. 8 is a diagrammatic view illustrative of the operation of the semi-automatic control to which my machine is adapted.

With reference to the drawings, the machine therein illustrated comprises a bed or base 1 on which are mounted bearings 2, 2 for a rotary hollow spindle 3. This spindle is driven in conventional manner from a motor (not shown) through gearing enclosed within housings 4 and 5, said gearing being such as to provide for various speed changes, which may be effected through a series of levers 6, and for reversal through a lever 7 of the direction of rotation. The details of construction and operation of this portion of the machine form no part of the present invention and are well understood in the art.

On each end of the spindle 3 is mounted a work-supporting device, 8 and 9 respectively, these devices being adapted to hold the work 11, which extends through the hollow spindle 3, in proper position to be operated on by the thread-cutting elements of the machine. The devices 8 and 9 may be standard jaw-type chucks, the jaws being opened and closed through the medium of levers 12 pivotally mounted on the frame of the machine and at their lower ends operatively engaging collars 13 which are axially slidable on the spindle 3 and which in turn are operatively connected with the said jaws. This operative connection, as shown in Fig. 6, takes the form of a series of toggles, each consisting of pivotally connected links 14 and 15, the link 14 being pivotally attached to the sleeve 13, while the link 15 is pivotally mounted at 16 in the body of the chuck. The link 15 constitutes in effect a lever, the inner free end of which engages a jaw of the chuck in such manner as to move the latter radially in the chuck body and toward and from the work as the said link or lever 15 is actuated by axial movement of the sleeve 13. In the holding device 9, as shown in the sectional view of Fig. 6, the normal jaws are replaced by slides 17 each having a projecting bracket arm 18. This arm has a radial bore in which is slidably mounted a plunger 19 which carries at the outer end a roller 21. The inner end of the plunger 19 is located in a cylinder 22, a flange 23 preventing displacement of the plunger from the bracket and also constituting a seat for one end of a spring 24, the other end of which is confined by a plug 25 threaded into the end of the cylinder. The rollers 21, as illustrated, are adapted to engage the surface of the work to thereby hold this work in centered position with respect to the threading elements, the springs, however, permitting a certain freedom of movement of the supported end of the work so that it may adjust itself freely to the threading tool. A true centered position of the work with respect to the cutters is thus automatically obtained. The device 9 in conjuction with the chuck 8 therefore constitutes a work support which by reason of its self-centering characteristics insures threads of the quality desired in spite of minor imperfections in the work stock. The levers 12 in turn are actuated through a hydraulic or other motor 26 mounted in the present instance at the top of the frame of the machine and controlled by means of a lever 27.

The thread-cutting mechanism is mounted on a carriage 28 slidably mounted on the bed 1, and a lead screw 29 is provided for advancing the carriage on its slide, the usual means in the form of an adjustable lead nut (not shown) being provided for operatively connecting and disconnecting the carriage from the screw as required. Provision is also made for advancing and retracting the carriage manually, this means consisting of a rack 31 on the carriage which is engaged by a pinion 32 on a shaft 33 journaled in the bed 1 and having at its outer end a hand wheel 34. The lead screw 29 extends longitudinally of and is journalled in the bed 1 and is driven from the spindle 3 or in synchronism therewith, and means is provided in the form of a gear box 35 for changing the ratio between the spindle and lead screw revolutions.

Mounted on the carriage 28 is a body member 36 having an opening 37 in axial alignment with the spindle 3 and with the holding means 8—9. This opening 37 is in effect defined by a ring 38 which is secured by screws to the said body member. Formed in the body member 36 and terminating at their inner ends in the opening 37 is a plurality of oblique guideways 39 for reception of the chaser carriers 41, chasers 42 being clamped in the usual manner to the inner ends of said carriers. The ring 38 constitutes a retainer for a cam ring 43, this ring having formed therein cam slots 44 eccentric to the geometric center of the ring 38 and the cam ring 43. The carriers 41 are each provided with a roller 45 which respectively project into the cam slots 44 whereby when the ring 43 is rotated on the body 36 by means hereinafter set forth, the carriers 41 are fed longitudinally of their respective guides to or from the center of the opening 37, depending on the direction of said rotation.

Individual small adjustments of the carriers 41 in their guides may be effected through the rollers 45. These rollers, as shown in Figs. 3 and 4, are mounted upon pins 46, which in turn are rotatably mounted in the carriers 41. As shown in Fig. 3, flatted recesses are provided on the pin 46 at opposite sides of the center line to provide bearings for a pair of set screws 47 threaded into the end of the carriers 41. The pin 46 may be rotated either way in the carrier by relative adjustments of these set screws 47. The cylindrical extension 48 of the pin 46 which constitutes the journal for the roller 45 is eccentric to the axis of the body of the pin 46 whereby the aforesaid rotation of the pin in the carrier results in an adjustment of the roller longitudinally of the carrier and a consequent longitudinal adjustment of the carrier in its guide.

The ring 43 is turned to simultaneously advance and retract the chasers through the medium of interengaging racks 49 and 51, the rack 49 being segmental in form and being carried in a segmental bar 52 slidably mounted in an extension 53 of the body member 36, as also is the rack bar 51. Wear developing in the parts is compensated by wedge-shaped shoes 54, 54 adjustable between the bars 51 and 52.

Depending from the extension 53 of the body 36 is a bracket 55 which is provided with a longitudinal undercut groove for reception of a beveled bar 56, this bar being slidable in the groove in a direction parallel to the common axis of the spindle 3 and the ring 43. A wedge-like gib 57 is provided for taking up wear developing between the bar 56 and the contacting parts of the bracket 55. Pivotally mounted on the bar 56 is a sine or guide bar 58 which may be adjusted to an angular position with respect to its supporting bar 56. As shown in Fig. 1, the ends of the sine bar are slotted for reception of clamping screws 59 whereby the said bar may be retained in any desired adjusted position. Tapered pins 61 may also be used in conjunction with registering apertures in the sine bar and in its supporting bar 56 for certain frequently required angles to facilitate angular adjustment of the sine bar to these positions. Slidably embracing the sine bar 58 is a block 62, which block is secured by means of set screws 63 and pivot pins 64 to the rack bar 51. An adjustable gib 65 is provided between the sine bar and the block 62 for the purpose of taking up wear developing between this bar and the block. It will be apparent that longitudinal movement of the bar 56 and the sine bar 58 must result, by reason of the angularity of the sine bar, in a movement of the rack bar 51 and a corresponding rotation through the rack 49 and segmental bar 52 of the cam ring 43, the ring being operatively connected with the said bar 52 by means hereinafter set forth. This mechanism is employed for cutting tapered threads, the degree of taper desired in the threaded stock being obtained by angular adjustment of the sine bar with respect to its carrier bar 56.

For the purpose of adjusting the threading mechanism for various diameters of cylindrical stock, an adjustable connection is provided between the cam ring and the ring-actuating mechanism described above. To the upper end of the segmental bar 52 is pivoted a handle lever 66, the pivot being designated by the reference numeral 67. To the lever 66 intermediate the pivot 67 and the outer end of the lever is pivotally secured a second lever 68, the opposite end of the lever 68 being connected to the cam ring 43 by means of a bolt 69 that passes through a concentric slot 71 in a projecting flange 72 of the said cam ring. By loosening the bolt 69, the cam ring may be freely adjusted independently of the levers 68—66 and the segmental bar 52, thereby permitting adjustment of the chasers to accommodate work of different sizes. It is apparent that when the lever 66 is pulled down into the position in which it is shown in Fig. 2, the cam ring 43 will be moved in a clockwise direction, resulting in the advancement of the chasers 42 towards the center of the work opening 37; and that when the lever 66 is turned upwardly as shown in Fig. 3, a reverse movement of the cam ring is effected drawing the chaser carriers outwardly in their slides.

For the purpose of securing micrometer-size adjustments of the threading tools, as may be desired for final cuts to gauge size, the lever 68, as shown in Fig. 3, is made telescoping in character, the telescoping sections being connected through a bolt or adjusting screw 73 having a micrometer dial 74. Expansion or contraction of the lever 68 through the medium of the adjusting screw 73 results in a partial corresponding rotation of the cam ring 43.

When forming tapered screw threads, it may be desired at times to take two passes of the cutters over the work, for example a roughing cut and a finishing cut, and to facilitate this operation, I provide a lever 75 having a boss 76 journaled in the outer end of the lever 68, and the boss 76 in turn is eccentrically pivoted on the bolt 69. It is apparent that angular adjustment of the lever 75 and consequent partial rotation of the boss 76 must, when the bolt 69 is tight, result in an adjustment of the cam ring 43 with respect to the lever 68. The lever 68 is provided with two notches 77 and 78 for interlocking engagement with a detent 79 on the lever 75. A shifting of the lever 75 from the position in which it is shown in Fig. 3 until the detent 79 engages in the recess 78 results in a clockwise movement of the cam ring 43 and a consequent advancement of the chasers toward the work for the final cut.

Mounted on the bed plate 1 paralleling the guideways for the carriage 29 is a plate 81 having a longitudinal series of keyways or slots 82. Slidably mounted on the plate is a pair of brackets 83 and 84 each provided with a locking pin (not shown) adapted to engage in the slots 82 to lock the brackets in adjusted positions, the said pins being advanced into engagement with the slots and retracted from engagement by levers 85.

Each bracket carries an adjustable screw, 86 and 87 respectively, the inner ends of which lie in the path of the bar 56. The screws 86 and 87 thereby constitute stops limiting the longitudinal movement of the bar 56. By adjusting the brackets 83 and 84 longitudinally of the supporting plate 81, it is apparent that the possible movement of the bar 56 may be regulated irrespective of the travel of the carriage 28 with which the bar 56 is normally movable.

The operation of the mechanism hereinbefore described is as follows: The cylindrical work 11 is inserted through the spindle 3 and the holding means 8 and 9 with the end thereof to be threaded projecting beyond the face of the latter. The motor 26 is then actuated through the lever 27 to cause the jaws of the clutch 8 and the rollers 21 of the device 9 to grip the work to thereby hold it in proper position relative to the thread cutters mounted on the carriage 28. This carriage 28 is then moved away from the chuck 9 and the projecting end of the work by means for example of the hand wheel 34 until the end of the bar 56 comes in contact with the stop screw 86. Further rearward movement of the carriage now causes a relative movement between the bar 56 and the carriage, and this movement is continued until the scale 88 on the bar 56 registers the desired length of the thread to be cut. The carriage 28 is now advanced in the opposite direction until the chasers or cutters 42 just touch the end of the work, after which the bracket 84 is advanced until the stop screw 87 just engages the end of the bar 56. The carriage is now operatively engaged with the lead screw 29 by means, for example, of a lever 89, whereupon the carriage is advanced upon the work at a rate synchronized with the rotational speed of the spindle 3 to give a thread of the desired pitch. In this movement of the carriage 28, the bar 56 and the sine bar 58 secured thereto are held stationary by the stop screw 87, and when the full length of the thread has been cut, as indicated by the registration of the two zero marks of the scale 88, the lever 66 is thrown upwardly to withdraw the chasers from the work, thereby terminating the cutting operation. The travel of the carriage 28 is interrupted by disengagement of the lead nut from the screw 29 through the medium of the lever 89; or provision may be made, as shown in Fig. 5, for performing this operation automatically. As therein illustrated, the bar 56 is provided with a cam 91, while the carriage 28 has mounted thereon a bellcrank-lever 92, one end of which carries a roller 93, while the other end carries an adjustable set screw 94 arranged for engagement with a rod 95 operatively associated with the lever 89 or with some other suitable member of the lead screw mechanism. Following engagement of the lead screw by manipulation of the lever 89 as previously described, the rod 95 and the associated elements occupy the relative position shown in Fig. 5. As the carriage 28 reaches the end of its movement in the thread-cutting operation, the roller 93 engages the cam 91 and is elevated by the latter, thereby shifting the bell-crank-lever in a clockwise direction with reference to the illustration, which shifts the push rod 95 to the right, thereby disengaging the lead nut and interrupting the forward movement of the carriage.

The mechanism hereinbefore described lends itself to semi-automatic operation by compressed air or hydraulic means, as illustrated in Fig. 8, wherein the parts of the machine previously described are indicated by the corresponding reference numerals. In accordance with this system, the tubular work 11 is passed into the spindle 3 and through the holding devices 8 and 9, as previously described, the advance movement of the work into the machine being limited by a stop 96 secured to the body member 36 of the thread-cutting unit. The stops 87 and 86 are so adjusted that when the carriage 28 is in the extreme retracted position, the bar 56 and the sine bar 58 carried thereby are adjusted to a position corresponding to the length of the thread to be cut, as indicated on the scale 88; and when the carriage has been advanced to a position in which the chasers engage the work, as hereinafter described, the stop 87 is in contact with the end of the bar 56 which has been previously set, as described, through the medium of the stop 86. A valve 97 is now actuated manually to admit fluid pressure to ducts 98 and 99. The duct 98 leads to the inner end of a cylinder 101, within which operates a piston 102. This piston is operatively connected with the stop 96, and movement of the piston in the cylinder due to admission of fluid pressure through the pipe 98 adjusts the stop 96 to a position clear of the work 11. The fluid pressure admitted to the duct 99 passes to a valve 113 which is set to permit flow of said fluid pressure to the inner end of a cylinder 103 on the carriage 28. A piston 104 within this cylinder has a rod 105 rigidly fixed to the bed 1 of the machine, and fluid pressure admitted as described to the forward end of the cylinder advances the carriage 28 until the chasers or cutters 42 are brought into contact with the end of the work 11. In this position of the carriage, the stop 87 lies in contact with the end of the bar 56 which has been previously set as described. The lever 89, see Fig. 1, is now operated to engage the carriage lead nut with the lead screw 29 as previously described, whereby the advance working movement of the carriage is instituted. The lever 89 is also operatively connected with the fluid system in such manner that its initial movement in engaging the lead nut on the lead screw shuts off the fluid pressure from the cylinder 103. The threading cutters are now advanced at a given rate upon the work in the thread-cutting operation, this movement continuing until an adjustable stop element 106 on a lever 107 pivotally mounted on the body member 36 engages the end of the work, whereupon the lever 107 is turned on its pivot so as to actuate a valve 108. This actuation of the valve 108 admits fluid pressure to the under side of a cylinder 109 mounted on the body member 36 and operatively connected through a piston 111 and piston rod 110 with the cam ring 43. The fluid pressure in the cylinder 109 advances the piston 111 in the latter and thereby turns the cam ring 43 in a direction retracting the cutters from the work. Simultaneously the cam 91 previously described engages the lever 92, which in this instance is provided with a projecting arm 112. This arm, when the lever is adjusted through engagement with the cam 91, actuates the valve 113 to admit fluid pressure to the outer end of the cylinder 103, thereby retracting the carriage 28 from the work. The movement of the lever 92 under operation of the cam 91 also releases the lead nut from the lead screw as previously set forth. The retractive movement of the carriage 28 continues to the extreme retracted position wherein the sine bar 58 is reset by contact of its carrier bar with the stop 86. The carriage 28 carries a cam 114 which as the carriage moves to its retracted position actuates the valve 97 to admit pressure to the outer end of the cylinder 101, thereby forcing the piston 102 forwardly and resetting the stop 96. The movement of the valve 97 also cuts off the pressure on the carriage cylinder 103. An arm 115 on the rod of the piston 102 engages the upwardly extending arm of the lever 107 and thereby returns that lever to its original position, again actuating the valve 108 to admit pressure to the upper end of the cylinder 109 to thereby advance the cutters to their original operative position. Following removal of the threaded stock and introduction of new work to the machine, the sequence of operations is repeated.

I claim:

1. In a threading machine, the combination with means for supporting the work, of a plurality of thread forming cutters, a support for said cutters movable longitudinally of the work and in which the cutters are movable transversely of the work, a cam ring mounted on the cutter support and operative by rotation to convergently and divergently move the cutters in the transverse direction, a rack slidably mounted in the cutter support, adjustable linkage operatively connecting the rack with the cam ring, and a relatively fixed bar having slidable connection with said rack and adjustable to positions angularly disposed to the path of said cutter support whereby the rack in its movement with the cutter support is longitudinally displaced to actuate the cam ring.

2. In a threading machine, the combination with work-supporting means, of a tool holder movable longitudinally of the work, a plurality of thread forming cutters movable convergently and divergently in said holder transversely of the work, and mechanism actuated by the longitudinal movement of the holder for transversely converging and diverging the cutters, said mechanism comprising a member movable with and in the holder in the said longitudinal direction, a guide carried by said member and adjustable to angular positions with respect thereto, an element movable on the guide and with the tool holder, adjustable means for immobilizing the said member with respect to the holder, and means for operatively connecting said element with the cutters whereby movement of the element angularly of the path of the holder effects transverse feed of the cutters.

3. In a threading machine, the combination with work-supporting means, of a tool holder movable longitudinally of the work, a plurality of thread forming cutters movable in said holder transversely of and convergently and divergently with respect to the work, and mechanism actuated by the longitudinal movement of the holder for transversely moving the cutters, said mechanism comprising a member movable with and in the holder in the said longitudinal direction, a guide carried by said member and adjustable to angular positions with respect thereto, an element movable on the guide and with the tool holder, a stop adjustable in the said longitudinal direction and in the path of said member, means for anchoring the stop, and means for operatively connecting said element with the cutters whereby movement of the element angularly of the path of the holder effects a transverse feed of the cutters.

4. In a threading machine, the combination with work-supporting means, of a tool holder movable longitudinally of the work, a plurality of thread forming cutters movable in said holder transversely of the work, and mechanism actuated by the longitudinal movement of the holder for transversely moving the cutters, said mechanism comprising a member movable with and in the holder in the said longitudinal direction, a guide carried by said member and adjustable to angular positions with respect thereto, an element movable on the guide and with the tool holder, a stop at each end and in the path of said member and adjustable in the said longitudinal direction, means for anchoring the stops, and means for operatively connecting said element with the cutters whereby movement of the element angularly of the path of the holder effects a transverse feed of the cutters.

5. In a threading machine, the combination with work-supporting means, of a tool holder, a plurality of thread forming cutters movable in said holder transversely of the work, means for simultaneously relatively rotating and axially moving the work and said holder for the thread-cutting operation, and means for transversely simultaneously moving the cutters including a member engaging the cutters and adjustable on the holder, mechanism for actuating said member to progressively transversely move the cutters during the said cutting operation, and linkage connecting said member with the mechanism, and means for manually extending and contracting said linkage to actuate said member independently of said mechanism.

6. In a threading machine, the combination with work-supporting means, of a tool holder, a plurality of thread forming cutters movable in said holder transversely of the work, means for simultaneously relatively rotating and axially moving the work and said holder for the thread-cutting operation, and means for transversely moving the cutters including a member engaging the cutters and adjustable on the holder, mechanism for actuating said member to progressively transversely move the cutters during the said cutting operation, and transmission means connecting said mechanism and member, and a plurality of independent means associated with said transmission means for actuating said member independently of said mechanism, at least one of said independent means providing for micrometer adjustments of said member.

7. In a threading machine, the combination with work-holding means, of a plurality of thread forming cutters and a carrier for said cutters, means for simultaneously relatively rotating and axially moving the work and said carrier for the thread-cutting operation, means to progressively transversely move the cutters during the said cutting operation for feeding the cutters in the carrier transversely of the work, mechanism for actuating said feeding means, and means for operatively connecting said mechanism with the feeding means including a toggle link for actuating the feeding means independently of the said mechanism.

8. In a threading machine, the combination with work-holding means, of a plurality of thread forming cutters and a carrier for said cutters, means for feeding the cutters in the carrier transversely of the work, mechanism for actuating said feeding means, and means for operatively connecting said mechanism with the feeding means comprising a lever pivotally secured to said feeding means and having an eccentric hub, a link embracing said hub and connected with the said mechanism, and releasable means for immobilizing the said lever with respect to the link.

9. In a threading machine, the combination with work-holding means, of a plurality of thread forming cutters and a carrier for said cutters, means for feeding the cutters in the carrier transversely of the work, mechanism for actuating said feeding means, and means for operatively connecting said mechanism with the feeding means comprising a pin adjustably secured in said feeding means, a lever journaled on the pin and having an eccentric hub, a link embracing said hub and connected with the said mechanism, and releasable means for immobilizing the said lever with respect to the link in a plurality of selective relative positions.

10. In a threading machine, the combination with work-holding means, of a plurality of thread forming cutters and a carrier for said cutters, means for simultaneously relatively rotating and axially moving the work and said carrier for the thread-cutting operation, a rotatable cam ring for feeding the cutters in the carrier transversely of the work, a member slidably mounted in the carrier on an arc concentric with the cam ring, means for operatively connecting the said member with the cam ring whereby movement of the member effects a corresponding movement of the ring, and mechanism for actuating said member, said mechanism comprising a toothed rack operatively engaging said member and slidably mounted in the carrier, and means actuated by the said relative movement of the carrier and the work for longitudinally operating the rack.

11. In a threading machine, the combination with work-holding means, of a plurality of thread forming cutters and a carrier for said cutters in which said cutters are mounted for convergent and divergent adjustment transversely of the work, a cam ring rotatably mounted on the carrier and having eccentric slots, bearing pins rotatably mounted in the respective cutters and each having an eccentric extension constituting a journal for a roller, which rollers occupy the respective cam slots, and means for adjusting the said pins rotatably in the cutters to effect individual transverse adjustments of the cutters in the carrier.

12. In a threading machine, the combination with work-holding means, of a plurality of thread forming cutters and a carrier for said cutters in which said cutters are mounted for convergent and divergent adjustment transversely of the work, a cam ring rotatably mounted on the carrier and having eccentric slots, bearing pins rotatably mounted in the respective cutters and each having an eccentric extension constituting a journal for a roller, which rollers occupy the respective cam slots, and means for adjusting the said pins rotatably in the cutters to effect individual transverse adjustments of the cutters in the carrier, said adjusting means comprising set screws threaded into the body of each of said cutters and respectively engaging recesses at opposite sides of the centers of the respective pins.

13. In a thread-cutting machine, the combination with a rotary work holder and mechanism for rotating said holder, of a plurality of thread forming cutters and a carriage for said cutters movable longitudinally with respect to the work, mechanism for longitudinally advancing the carriage, means on said carriage for controlling the connection of the carriage with the advancing mechanism, and means for regulating the travel of said carriage comprising an element movable with and with respect to the carriage, means for regulating the movement of said element with the carriage in accordance with the length of thread desired, and means for operatively connecting the element with the said control means whereby a predetermined relative movement of the element and carriage automatically disconnects the carriage from the advancing mechanism.

14. In a thread-cutting machine, the combination with a rotary work holder, of a thread forming cutter and a carriage for said cutter movable longitudinally of the work, a stop on said carriage determining the position of the work in the work holder, means for displacing said stop to an inoperative position and for simultaneously actuating the carriage to bring the cutter into engagement with the work, independent means for advancing the carriage on the work at a predetermined rate, manual means for actuating said carriage-advancing means and for simultaneously interrupting operation of the carriage-actuating means first named, means operative automatically after a predetermined advance movement of the carriage to interrupt operation of said advancing means and for retracting the cutter from the work, and for subsequently reversely actuating the carriage to withdraw it from the work, and means operative automatically following withdrawal of the carriage to reset said stop and to advance the cutter transversely to an operative position.

15. In a threading machine, the combination with means for supporting the work, of a plurality of thread-forming cutters, a carrier for said cutters in which the cutters are movable transversely of the work, and means for simultaneously relatively rotating and axially moving the work and said carrier for the thread-cutting operation, a cam ring mounted on the cutter carrier and operative by rotation to convergently and divergently move the cutters in the transverse direction, a rack slidably mounted in the cutter carrier, adjustable linkage operatively connecting the rack with the cam ring, a bar constituting an actuating cam for said rack and adjustable to different angular positions, and means for relatively moving said bar and rack simultaneously with the said relatively axial movement of the work and said carrier whereby the rack is longitudinally displaced to actuate the cam ring.

SAMUEL W. MATHIAS.